United States Patent Office 3,299,239
Patented Jan. 17, 1967

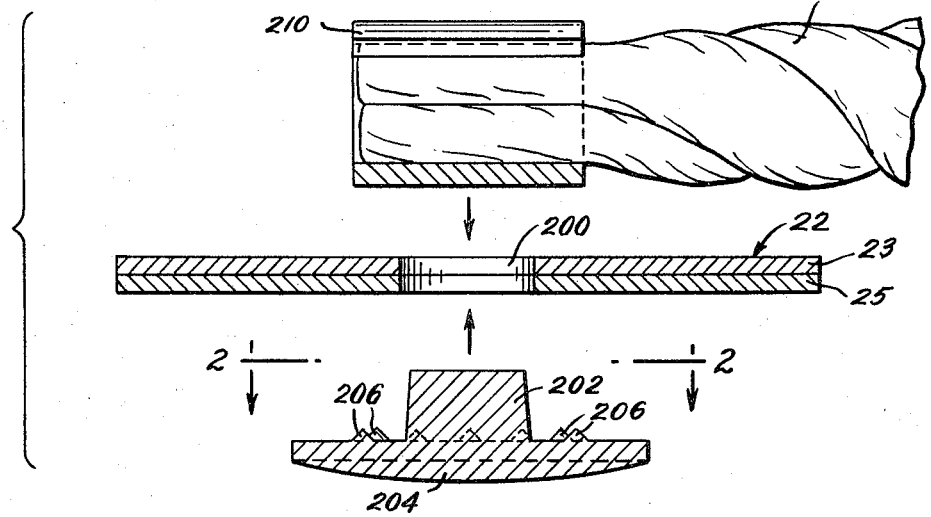
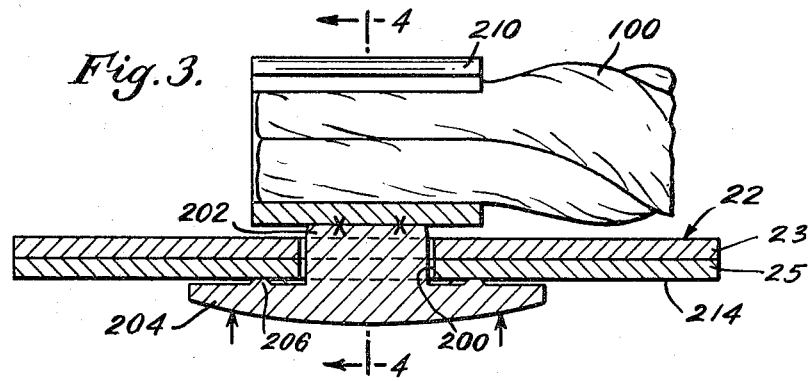
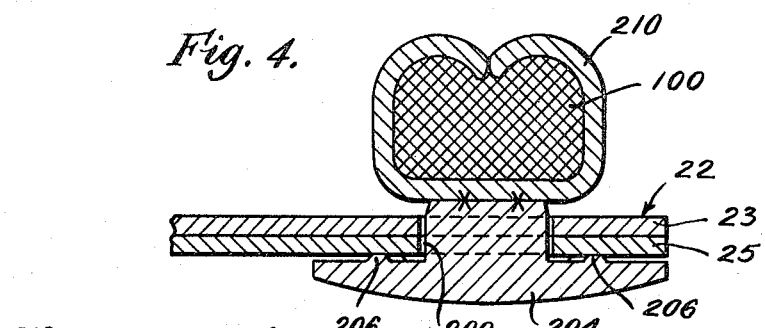
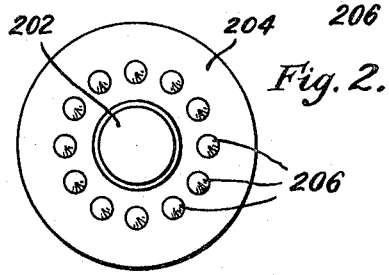

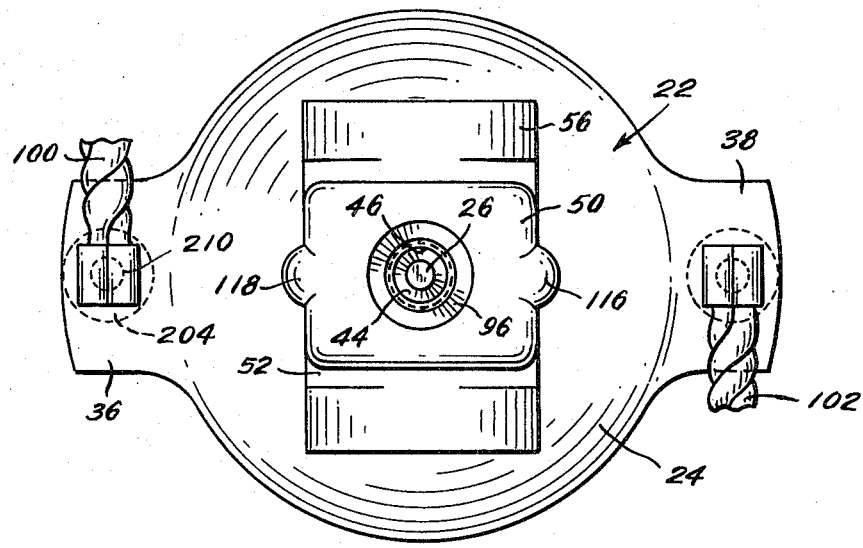

3,299,239
RIVET FOR WELDED ELECTRICAL CONNECTIONS
Robert G. Mawney, Louis C. Beggs, and Robert A. Renaud, Attleboro, Mass.; said Mawney and said Beggs assignors to Texas Instruments Incorporated, Dallas, Tex., a corporation of Delaware
Continuation of application Ser. No. 97,409, Mar. 17, 1961, which is a division of application Ser. No. 34,043, June 6, 1960. This application Jan. 25, 1965, Ser. No. 436,977
5 Claims. (Cl. 200—166)

This application is a continuation of our copending application, Serial No. 97,409, filed March 17, 1961, and now abandoned, and entitled, "Electrical Connections and Methods of Making Same," which in turn is a division of Serial No. 34,043, filed June 6, 1960. This invention relates to thermostatic devices, and in particular, to improved means and methods of making electrical connections to such devices.

It is one object of the instant invention to provide a simple and low-cost means for electrically connecting an electrically conductive member to a thermostatic element.

It is another object of the instant invention to provide a simple, economical and low-cost means for electrically connecting an electrically conductive member to a thermostatic element which does not upset or deleteriously affect the calibration of the thermostatic element.

Other objects will be in part apparent and in part pointed out hereinafter.

The invention accordingly comprises the elements and combinationst of elements, steps and sequence of steps, features of construction and manipulation, and arrangements of parts, all of which will be exemplified in the structures and methods hereinafter described, and the scope of the application of which will be indicated in the following claims.

In the accompanying drawing, in which one of the various possible embodiments of the invention is illustrated:

FIG. 1 is an exploded elevational view illustrating an electrical connection between parts, according to the instant invention;

FIG. 2 is a view taken on line 2—2 of FIG. 1;

FIG. 3 is a view similar to FIG. 1, showing the parts in final assembled relation;

FIG. 4 is a sectional view taken on line 4—4 of FIG. 3; and

FIG. 5 is a top plan view showing a snap-acting thermostatic disc provided with electrical connections according to the present invention.

Similar reference characters indicate corresponding parts throughout the several views of the drawings.

Referring now to FIG. 1, there is illustrated the means and technique for electrically connecting an electrically conductive member, for example, a lead or pigtail 100, to a thermally responsive member such as, for example, a thermostatic disc 22. Thermally responsive member 22 may, for example, be an inherently snap-acting thermostatic disc or element of the type described in the Spencer United States Patent No. 1,448,240 or the Vander Pyl et al. United States Patent No. 2,694,121. Snap-acting element 22 may include a deformed or dished portion 24 (as best seen in FIG. 5) which is responsible for its snap action. As is well known in the art, such snap-acting elements are snappable in response to temperature change (for example, due to heating thereof upon the flow of a current overload therethrough) from a first position of relative stability to a second position of relative stability, and upon cooling thereof, the element (if of the automatic reset type) will snap from said second position back to said first position. It will be understood that the thermostatic disc, prior to being electrically connected to lead or pigtail 100, will have been calibrated, or at least initially calibrated, prior to assembly of the latter into an electrical switch, such as that disclosed in our copending parent application referred to above.

It is a general object of this invention to connect the electrically conductive member 100 in permanent electrical connection with the thermostatc element or disc 22, but to accomplish this without upsetting or deleteriously shifting the calibration of the disc.

It has been found that when the electrically conductive member or pigtail is welded directly to the thermostatic or bimetallic disc or element itself, there is an attendant deformation of the thermostatic disc due to the very high heat concentration which undesirably and deleteriously shifts the disc calibration. Further, many times the thermostatic bimetal of the disc is of very thin gauge, and does not provide sufficient means or mass for welding purposes.

We have discovered that the features illustrated in FIGS. 1–4, to be described below, advantageously obviate these problems, and additionally permit electrically securing a pigtail or electrically conductive member to the thermostatic element, even when such is of a very thin gauge, without deleteriously shifting or affecting the calibration thereof.

Thermostatic element 22 is provided with an aperture (which may be spaced from the nondevelopable or dished portion of the disc) which is adapted to loosely receive shank 202 of rivet 204. Rivet 204 is conveniently formed of a good, electrically conductive, readily weldable material, such as steel or Monel.

Rivet 204 (as best seen in FIGS. 1 and 2) includes a plurality of diamond or conical shaped projections 206. Pigtail or electrically conductive member 100 is provided with a welding cap 210, which may be secured thereto as by crimping (see FIG. 4). Rivet 204, thermostatic element 22, pigtail 100 and welding cap 210 are assembled in the manner shown in FIG. 1. Shank 202 is disposed within aperture 200, with diamond or conical points 206 in engagement with the undersurface 214 of thermostatic element 22, as shown in FIG. 3. Aperture 200 is somewhat larger than shank 202, so that the latter may be loosely confined within the former and to preclude contact therebetween. Shank 202 further is of such a height as to protrude or project beyond the outer surface of thermostatic element 22 when the rivet 204 is disposed within the aperture 200 and diamond points 206 are in engagement with surface 214 of thermostatic element 22. The problems of deleteriously shifting the calibration of the thermostatic disc during welding of an electrical conductor to the disc are advantageously eliminated by the instant invention. The rivet 204 is initially welded to the thermostatic element 22, for example, by resistance welding. The diamond points 206 serve as the weld points and fixedly secure the rivet 204 to the thermostatic element 22 in good electrical connection therewith. It is to be noted that the welding of the rivet to the thermostatic bimetal generally takes place prior to deformation of the thermostatic material to provide the dished portion and disc element and also prior to calibration of the disc element. It will be noted that the only areas of contact between the rivet 204 and the thermostatic bimetal element 22 are at the weld projection points 206. Shank 202 is disposed in aperture 200 and is maintained out of engagement therewith. Thus, there is minimum surface-to-surface contact between the rivet 204 and the thermostatic bimetal element 22.

After the rivet 204 has been secured to the thermostatic bimetal element 22, the latter can be deformed to provide the dimpled portion (not shown) responsible for snap action and can be calibrated. After calibration and temperature setting of the thermostatic disc 22, the latter can be incorporated into its assembly, for example, such as the subassembly 20 described in the aforesaid parent application for electrical switch 10, and thereafter the pigtail or electrical lead 100 may conveniently be welded and electrically secured thereto as will be described below.

Pigtail 100 is electrically connected to thermostatic element 22 by welding the cap 210 to the projecting portion of shank 202, as shown in FIGS. 3 and 4, as by resistance welding. During and after welding of the welding cap 210 to the projecting part of shank 202, the latter is maintained out of contact with and in spaced relation to the side surfaces of aperture 200 in thermostatic element 22. It is to be understood that during or after welding of the pigtail 100 to the shank 202, there is some flow of material either from the shank 202 or the welding cap, about the oversized disc hole 200, but not so much flow as to cause engagement or contact with the thermostatic element adjacent or about the shank which might stress or deform the disc. It will also be noted that after welding of the pigtail 100 to shank 202, the welding cap 210 is maintained in spaced relationship with the upper surface of thermostatic disc 22 to advantageously avoid stressing or deforming the disc which might deleteriously shift or upset the calibration thereof.

It is to be understood that if desired, other types of welding projections may be provided instead of the diamond shaped projections 206. For example, the welding projection might comprise a conventional welding ring. The important feature is that there be a minimum of physical contact between the thermostatic element and the rivet 204. Welding cap 210 serves the dual function of maintaining the strands or wires which comprise pigtail 100 into a dense mass and precludes them from unraveling during handling and welding and affords a constant and uniform area to weld to the projecting portion of shank 202 irrespective of the type of wire employed for the pigtail 100.

From the above it can be seen that the arrangement shown in FIGS. 1–4 advantageously permits quickly and conveniently welding and electrically connecting a pigtail to the thermostatic disc without changing or deleteriously shifting the calibration thereof. It is to be noted that the only physical contact with the thermostatic element is through the weld point projections, which contact is made prior to calibration and formation of the disc.

It will be understood that by providing the thermostatic disc rivet 204, that a greater variety of types and sizes of pigtails can be welded to the shank without affecting the temperature setting or calibration of the thermostatic disc 22, and affords a quick and low-cost method of securing the pigtail electrically to the thermostatic element.

In view of the above, it will be seen that the several objects of the invention are achieved and other advantageous results attained.

Dimensions of certain of the parts as shown in the accompanying drawing have been modified for the purposes of clarity of illustration.

As many changes could be made in the above constructions and methods without departing from the scope of the invention, it is intended that all matter contained in the above description or shown in the accompanying drawing, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

We claim:

1. In combination: a snap-acting thermostatic element having a deformed portion therein responsible for its snap action; said thermostatic element providing an aperture; an electrically conductive rivet including a shank portion; said rivet having a weld projection means engageable with one side of said thermostatic element; said shank disposed in said aperture and including a portion adjacent its free end projecting beyond an opposite side of said thermostatic element and said weld projection means; and an electrically conductive member welded to the projecting portion of said shank adjacent and spaced from the said opposite side of said thermostatic element, the aperture being larger than the cross section of the shank portion such that the shank portion is substantially free from engagement with the portion of the thermostatic element defining the aperture.

2. The combination as set forth in claim 1 and wherein said welding projection means includes a plurality of spaced projecting points.

3. The combination as set forth in claim 1 and wherein said electrically conductive member comprises a wire lead; said wire lead being provided with a welding cap; and said welding cap being welded to the projecting portion of said shank.

4. In combination: a snap-acting thermostatic element having a deformed portion therein responsible for its snap action; said thermostatic element providing an aperture; an electrically conductive rivet including a shank portion; said rivet having weld projection means engageable with one side of said thermostatic element; said shank disposed in said aperture and including a free end portion projecting beyond a side of said thermostatic element opposite to said one side and adapted to be welded to an electrically conductive member; and said aperture being sufficiently larger than the cross section of said shank whereby when said rivet is welded to said thermostatic element and before said electrically conductive member is welded to said projecting free end portion of said shank, said shank is substantially free from engagement with the portions of said thermostatic element defining said aperture.

5. The combination as set forth in claim 4 and wherein said welding projection means includes a plurality of spaced projecting points.

References Cited by the Examiner
UNITED STATES PATENTS

| | | | |
|---|---|---|---|
| 2,707,507 | 5/1955 | Tripp et al. | 219—93 X |
| 2,839,640 | 6/1958 | Epstein | 200—138 |

ROBERT K. SCHAEFER, *Primary Examiner.*

KATHLEEN H. CLAFFY, ROBERT S. MACON, H. O. JONES, *Examiners.*